June 7, 1966
M. L. ALLEN
3,254,900
VEHICLE WITH ADJUSTABLE OPERATOR'S STATION FOR MOVING SEMI-TRAILERS
Filed May 12, 1964
5 Sheets-Sheet 1
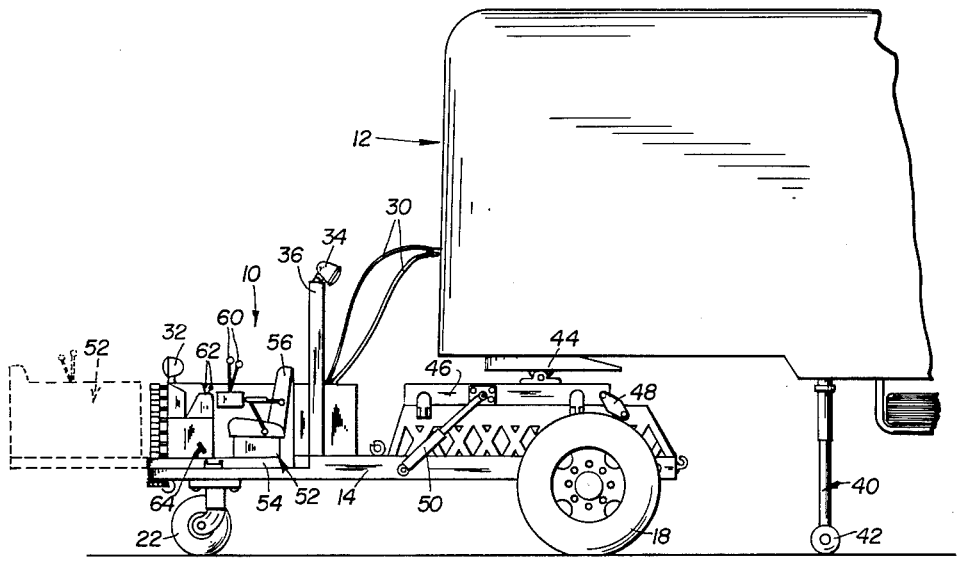
Fig. 1
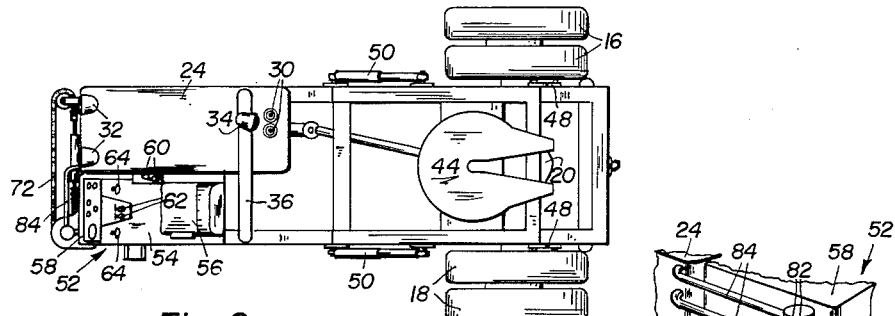
Fig. 2
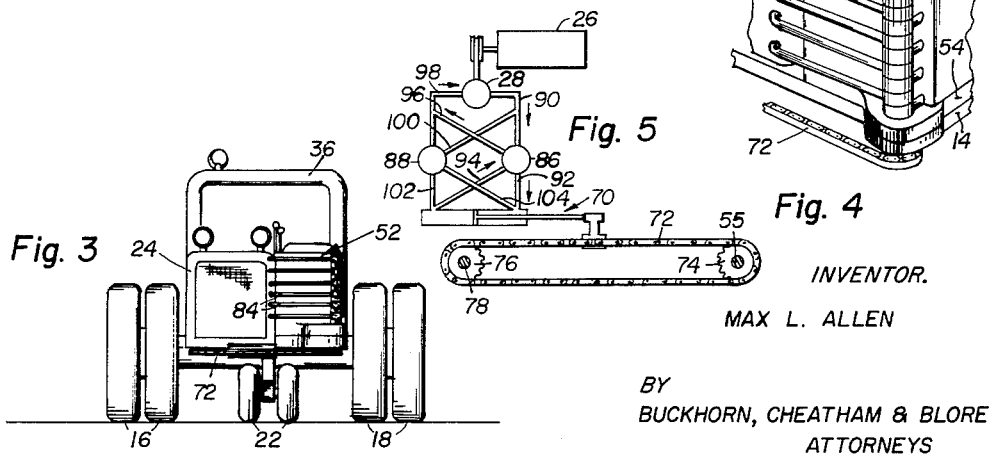
INVENTOR.
MAX L. ALLEN
BY
BUCKHORN, CHEATHAM & BLORE
ATTORNEYS

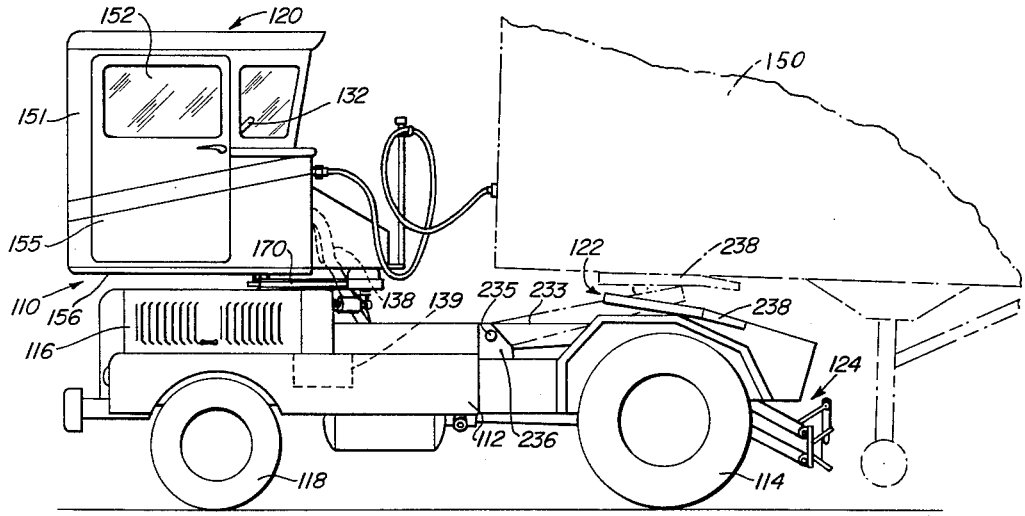
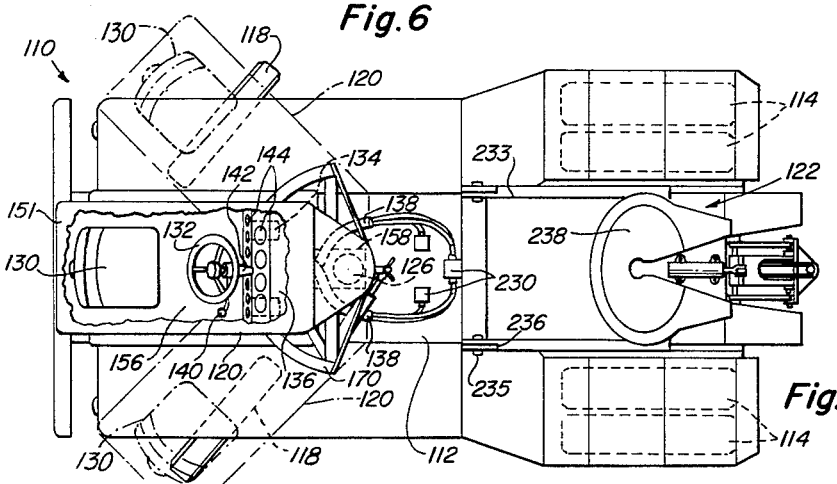
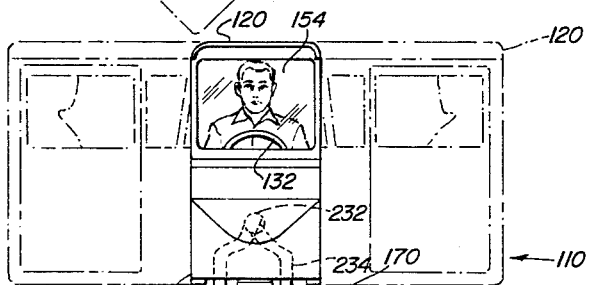
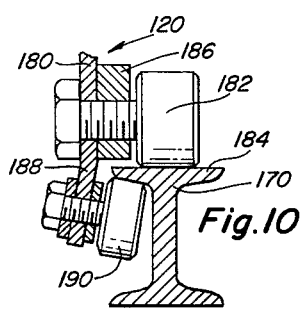
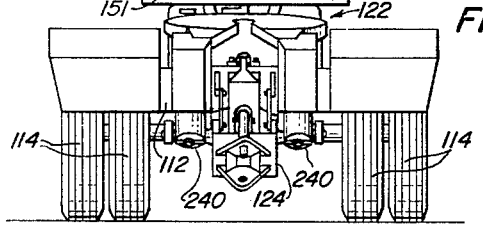

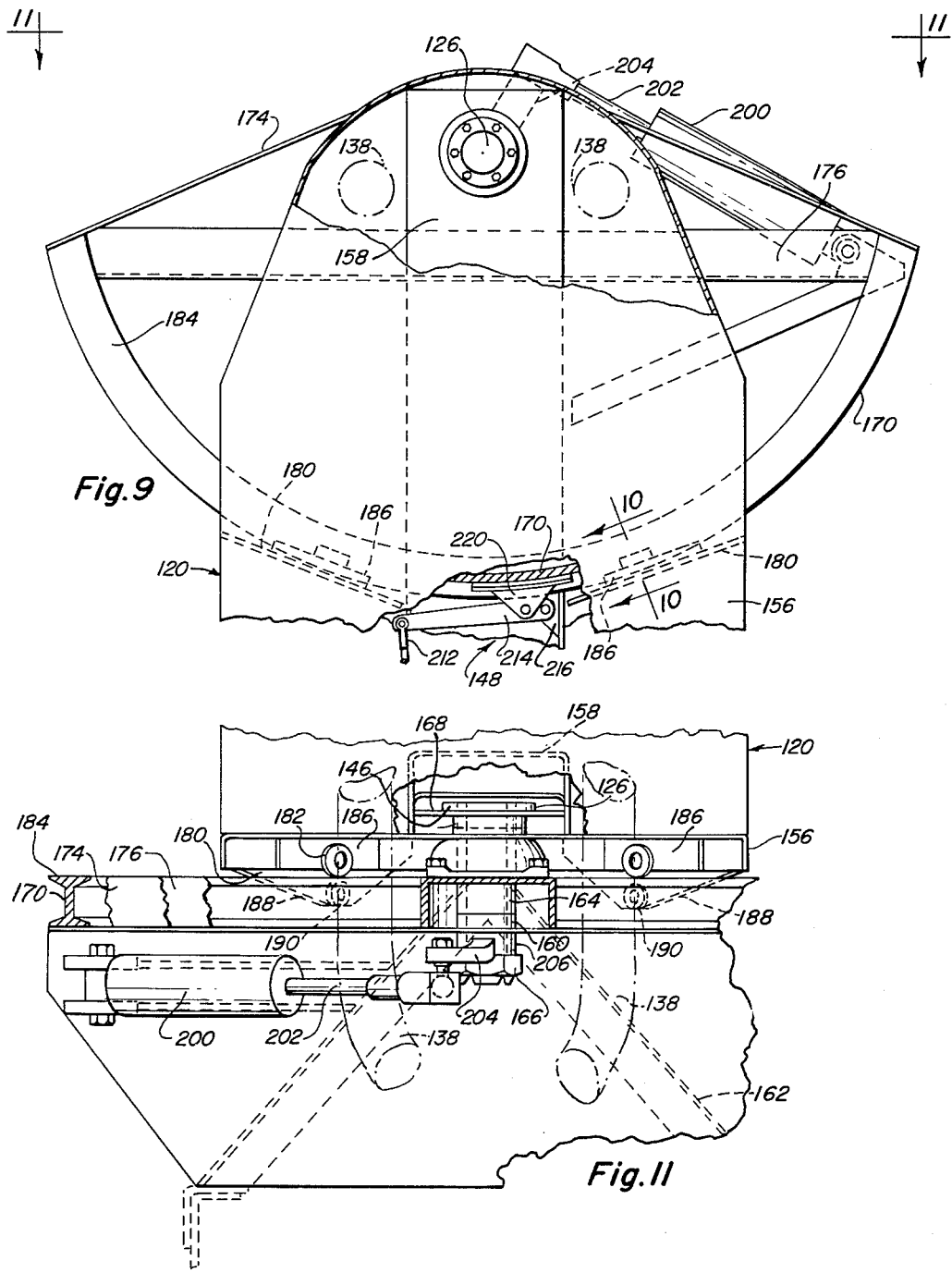

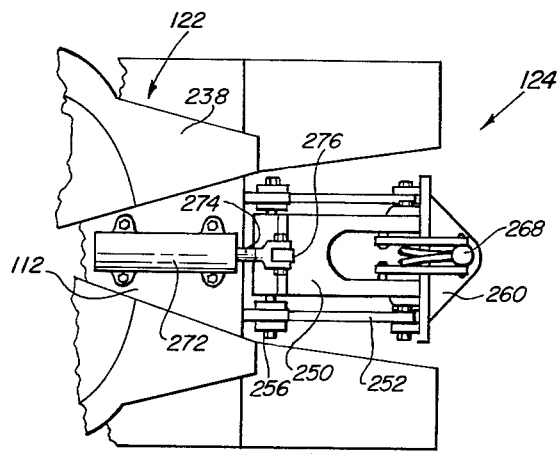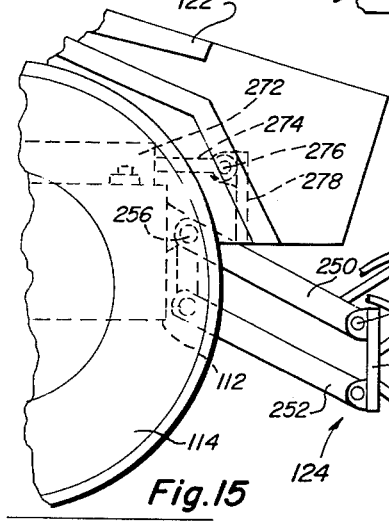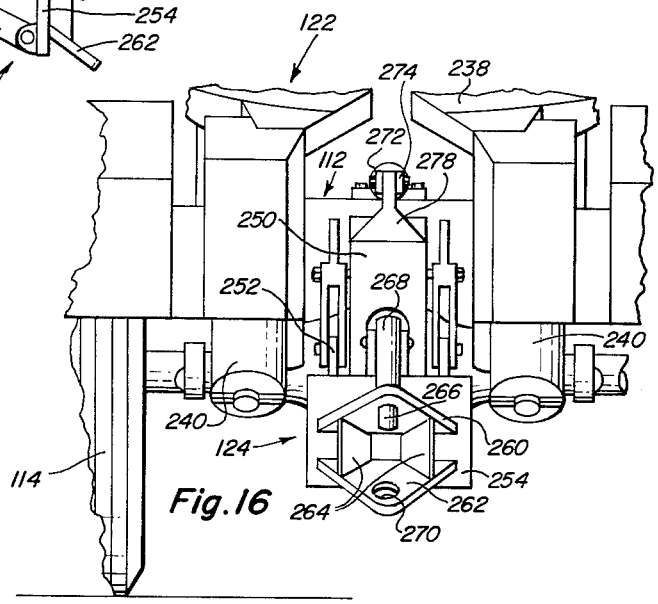

United States Patent Office 3,254,900
Patented June 7, 1966

3,254,900
VEHICLE WITH ADJUSTABLE OPERATOR'S STATION FOR MOVING SEMI-TRAILERS
Max Lee Allen, 8806 N. Portsmouth Ave., Portland, Oreg.
Filed May 12, 1964, Ser. No. 369,345
2 Claims. (Cl. 280—29)

This is a continuation-in-part of my copending application Serial No. 149,991, filed November 3, 1961, and since abandoned.

My present invention comprises a prime mover for yarding semi-trailers. The purpose of the present invention is to provide a highly maneuverable and safe automotive vehicle for shifting semi-trailers about shops, terminals, depots and the like. Usually, in yarding semi-trailers an extremely capable operator is necessary, since they must be placed accurately in confined quarters, a difficult operation to perform with an ordinary vehicle since the driver is seated with his back to the semi-trailer and his view is usually blocked thereby.

The principal object of the present invention is therefore to provide a vehicle of the character described in which the operator may shift his relative position with respect to the vehicle or the semi-trailer being moved by the vehicle. With the present invention the operator may quickly place himself so as to face his work, either in advance of the vehicle or at the side of the line of travel of the vehicle, so as to be able to observe the semi-trailer and its surroundings.

Another object of the invention is to provide prime movers for yarding semi-trailers in which each prime mover has a cab movable relative to the chassis and a steering control which is movable with the cab relative to the chassis without affecting the steering positions of the wheels of the prime mover.

The objects and advantages of the present invention will be more readily apparent from inspection of the following specification, taken in connection with the accompanying drawing, wherein like numerals refer to like parts throughout and in which an embodiment of the present invention is described and illustrated.

In the drawings:

FIG. 1 is a view in side elevation of the present invention attached to a semi-trailer (partly broken away) and showing an operator's control unit in normal position in full line and in dash outline in a selectable position;

FIG. 2 is a plan view of the prime mover without the semi-trailer attached thereto;

FIG. 3 is a front view in elevation of the prime mover;

FIG. 4 is a partial detail view, on an enlarged scale, showing details of the present invention;

FIG. 5 is a schematic diagram showing means for controlling the position of the operator's unit;

FIG. 6 is a side elevation view of a prime mover forming an alternate embodiment of the invention;

FIG. 7 is a top plan view of the prime mover of FIG. 6;

FIG. 8 is a rear elevation view of the prime mover of FIG. 6;

FIG. 9 is an enlarged, fragmentary, partially sectional, top plan view of the prime mover of FIG. 6;

FIG. 10 is an enlarged vertical sectional view taken substantially along line 10—10 of FIG. 9;

FIG. 11 is an enlarged, fragmentary, elevational view taken substantially along line 11—11 of FIG. 9;

FIGS. 14, 15 and 16 are enlarged, fragmentary, top plan, side elevation and rear elevation views, respectively, of a dolly pickup of the prime mover of FIG. 6.

Figure 12:
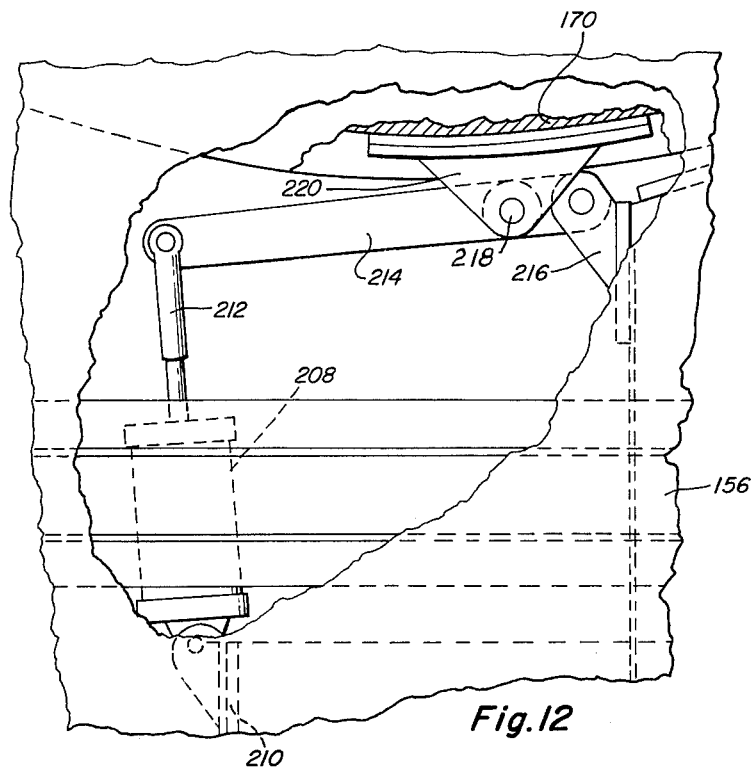
FIGS. 12 and 13 are enlarged top plan and elevation views, respectively, of a braking mechanism of the prime mover of FIG. 16.

In the illustration an automotive vehicle or prime mover 10 of the present invention is illustrated as being attached to a semi-trailer 12, for maneuvering the latter into a desired position. The vehicle 10 comprises a chassis 14 supported on wheels, the present illustration being of a tricycle vehicle having a pair of large rubber-tired wheels 16 at one side, and a similar pair of large rubber-tired wheels 18 at the opposite side, of a single rear axle assembly including a differential 20, and a single pair of small rubber-tired caster wheels 22 at the front of the chassis. Such a vehicle may be steered by braking the wheels 16 or 18 as desired, the firmness of braking determining the radius of movement of the vehicle. The present invention may be incorporated in any other type of vehicle having, for example, a single dirigible front wheel, or a pair of dirigible front wheels, or a four-wheel drive dirigible vehicle. The present illustration is of a preferred form of a vehicle which may turn in its own length.

The vehicle comprises an engine compartment 24 conveniently occupying the front right quarter of the chassis, the compartment enclosing an automotive engine 26 for powering the vehicle (FIG. 5). The engine compartment also encloses a pump 28 for circulating a hydraulic fluid under pressure and preferably would contain an air pump (not shown) for operating the pneumatic brakes of the semi-trailer through convenient flexible hoses 30. Forwardly directed head lamps 32 and a rearwardly directed, maneuverable spotlight 34 may be provided with current from a generator or battery (not shown). The spotlight 34 is conveniently mounted on a safety arch 36 in position to protect the driver in the event careless handling should tend to swing the prime mover under the trailer.

The semi-trailer is provided with the usual extensible wheeled jack assembly 40 including a wheel 42 which is lowered to the ground to support the front end of the semi-trailer when it is detached from the road cab. In accordance with the present invention the yard spotter need not operate the jack assembly 40, since the front end of the semi-trailer may be elevated sufficiently by means of a fifth wheel elevator assembly mounted on the chassis of the prime mover and including a fifth wheel device 44 adapted to be connected to the kingpin of the semi-trailer in the usual fashion. The fifth wheel device is mounted upon an elevator frame 46 pivotally connected at its rear end to the chassis by normally inclined links 48. Also connected between the chassis and the elevator frame 46 are a pair of oppositely inclined piston and cylinder devices 50, extension of which would raise the frame 46 and the front end of the trailer sufficiently to clear the jack wheel 42 from the ground.

In accordance with the present invention the left front portion of the chassis alongside of the engine compartment 24 is normally occupied by a movable operator's unit 52 including a platform 54 pivotally mounted at its left front corner on the chassis by means of a vertical pivot pin 55 (FIG. 5) located conveniently at the extreme left front corner of the chassis. Mounted upon the platform toward the rear thereof there is an operator's seat 56. Also mounted upon the platform is an instrument panel 58 facing the driver's seat, and a plurality of valve means indicated by the pair of valve actuating levers 60, another pair of valve actuating levers 62, and a pair of foot pedals 64. The levers 60 may constitute means for controlling the gear ratio of the driving connection between the engine and the driven wheels, the pedals 64 may control the driving or complete braking of the vehicle, and the levers 62 may control the admission and release of fluid from the elevator devices 50 and from an operator's unit control means to be described.

The operator's unit 52 may be swung horizontally through a substantial arc about the pivot 55 by motor means deriving power from the engine 26, such as schematically illustrated in FIG. 5 in which the motor means comprises a piston and cylinder device 70, the cylinder of which is fixedly mounted transversely of the front of the chassis and the piston of which is connected to one flight of a sprocket chain 72 trained about a sprocket 74 fixed to the pivot 55 and a sprocket 76 mounted on a stub shaft 78 at the opposite side of the chassis. The pivot 55 is journaled in the front of the chassis 14 and splined to the sprocket 74 and the platform 54, so that when the device 70 is extended or retracted the operator's unit may be swung horizontally under the control of the operator to the extent desired.

In order that the valve control means exemplified by the levers 60 and 62 and the pedals 64 may be operative in any position of the operator's unit, each valve is connected to conduits leading from the pump 28 to the respective valves and including swivel joints vertically in line with the pivot 55. As illustrated, the conduits include portions 80 leading from the instrument panel 58 to the vertically aligned group of swivel connections 82 and transverse portions 84 leading from the swivel connections into the engine compartment 24.

Control of the piston and cylinder device 70 is accomplished through a reversing system schematically illustrated in FIG. 5 wherein the directional arrows show the fluid flow to swing the control unit in one direction when one of a pair of valves 86 and 88 is shifted to a position such that fluid under pressure may flow from the pump 28 through a passage 90 to the valve and from there through a passage 92 to one end of the cylinder device. In such position the valve 86 would open a return passage comprising a conduit 94 leading from the opposite end of the cylinder device to the valve 86, a conduit 96 leading from the valve to the suction inlet 98 for the pump and through the suction inlet 98 into the pump 28. The valve 86 is of a suitable multiple port type, of which many are available, and has a blocking position so that the control unit may be arrested at any desired position. Pressure regulating devices, sumps and the like normally present in such fluid systems are not illustrated, being well known to those skilled in the art. Similarly when valve 88 is suitably operated the flow would be through conduit 90 and branch 100 to valve 88, through conduit 102 to the opposite end of the cylinder device. Simultaneously the other end of the cylinder device would exhaust fluid through conduit 104 to the valve 88 from which the fluid would return through conduit 98 to the pump. It will be appreciated by those skilled in the art that this is merely a schematic exemplification and other arrangements of valves and conduits can be devised to control the extension and contraction, and arrest of movement, of the piston and cylinder device 70.

Figure 13:
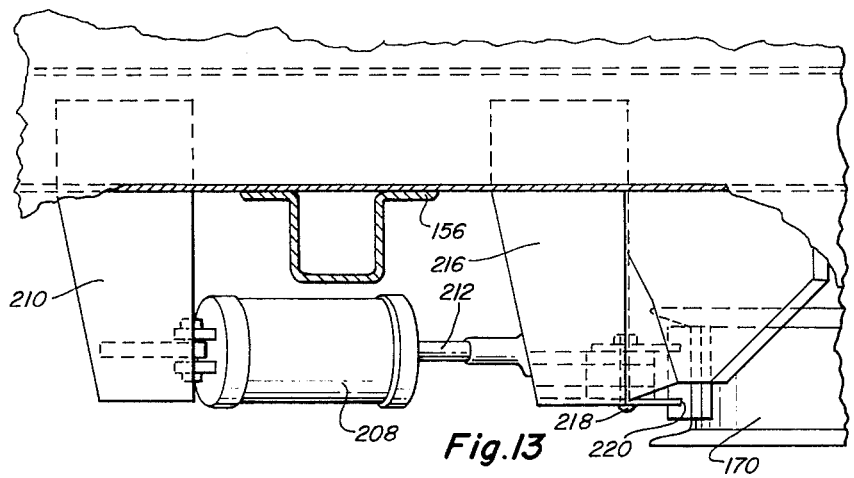

A prime mover 110 (FIGS. 6 to 15) forming an alternate embodiment of the invention includes a chassis 112, dual rear driving wheels 114 driven by an engine in hood 116, steerable, front wheels 118, an operator's cab 120, a fifth wheel lift mechanism 122 and a dolly pickup mechanism 124. The prime mover carries a source of hydraulic liquid under pressure, a source of air under pressure and a battery and generator which are common to other types of truck tractors. The cab 120 is selectively pivotal about pin 126, under the control of the operator, to any desired position between the two extreme positions shown in broken lines in FIGS. 7 and 8 to move the operator on seat 130 laterally of the chassis for optimum visibility. A steering wheel 132 forming a manually operable, remote steering control is carried by the cab and actuates known valving system 134 of the servo system type and carried by the cab in console 136 to turn the front wheels 118 of the prime mover 110 to desired positions relative to the chassis, the valving system 134 being connected by some of electrical, hydraulic and pneumatic lines and conduits 138 to a known power steering device 139 for steering the front wheels 118. Hence, while the cab is pivoted relative to the chassis, the operator merely holds the steering wheel in a fixed position relative to the cab to maintain the wheels 118 in the positions in which they are set. That is, to keep the positions of the wheels 118 unchanged relative to the chassis while pivoting the cab, the operator merely holds the steering wheel against turning and, even though the steering wheel is moved relative to the chassis, the wheels 118 are not turned relative to the chassis.

A known power gear shift control device 140 (FIG. 7) is mounted on steering column housing 142 for controlling direction and operative gear ratio of a known transmission (not shown) carried by the chassis and drivingly connected by conventional structure to the wheels 114, the control device 140 being connected by certain ones of the hydraulic conduits 138 to a known hydraulic actuation mechanism (not shown) associated with the transmission. Known manually operable remote controls 144 are provided on the console 136 and in the cab in positions convenient to the operator for operating the clutch, the fifth wheel lift mechanism 122, the dolly pickup mechanism 124, the pivoting of the cab relative to the chassis, a brake mechanism 148 (FIG. 9) of the cab, the brakes of a trailer 150 (FIG. 6), brakes of the prime mover 110, and a heater, lights and other electrical devices of the prime mover and the trailer.

The cab 120 (FIGS. 6 to 8) includes a body 151, windows 152, windshield 154, a door 155 and a rigid platform or floor 156, which has at the forward end thereof a rigid, channel-like member 158 projecting beyond the cab body 151 and forming a part of a turntable or swivel mechanism connecting the cab to the chassis. The member 158 is bolted to a flanged head 146 of the pin 126. The pin 126 projects into and is pivotal in a sleeve 160 (FIG. 11) carried rigidly in a vertical position by frame portion 162 of the chassis 112. A collar 164 of the pin rests on the top of the sleeve 160 and a nut 166 secured to the lower end of the pin holds the pin in the sleeve. A web 168 positioned below the top of the member 158 has a bore closely receiving the pin and is rigid with the member 158 to aid in fixing the member 158 rigidly to the pin 126. The frame portion 162 carries rigidly thereon an arcuate I-beam or track 170 in a fixed, horizontal position relative to the chassis. Radially extending arms 174 and a chordal brace 176 rigidly secure the track 170 to portions of the frame portion 162. The track is concentric with the pin 126.

The member 158 (FIGS. 9 to 11) has a pair of brackets 180 depending rigidly therefrom and, along with stiffening spacers 186, mounting top rollers 182, which rest on top flange 184 of the track 170. The brackets 180 also have inclined portions 188 mounting bottom rollers 190 in positions engaging the inclined bottom surface of the outer portion of the flange 184 of the track 170 to hold the cab against upward movement relative to the chassis. The rollers 182 and the pin 126 thus mount the cab 120 in an overhanging or cantilever fashion from the sleeve 160 and the track 170, and permit the cab to be moved relative to the chassis 112 with minimum friction between its extreme positions shown in broken lines in FIGS. 7 and 8.

To pivot the cab 120 relative to the chassis 112, there is provided a hydraulic cylinder 200 (FIGS. 9 and 11) pivotally connected at one end to frame portion 162 of the chassis and carrying a piston having a rod 202 pivotally connected to arm 204 fixed rigidly to the pin 126 by a sleeve 206. Hydraulic fluid is supplied to either end of the cylinder 200 under the control of the operator to swing the cab relative to the chassis, certain of the controls 144 (FIG. 7) being provided to actuate known valves (not shown) to control supply and exhaust to the ends of the cylinder 200 (FIGS. 9 and 11). A fluid pressure brake cylinder 208 (FIGS. 12 and 13) pivoted at one end to a bracket 210 depending from and rigid with the floor 156 of the cab serves to drive a piston rod 212 to swing a lever 214 pivotally mounted by bracket 216 which is secured rigidly to the floor 156. A pin 218 pivotally mounts a brake shoe 220 on the lever 214. Whenever the operator actuates the controls 144 to pivot the cab relative to the chassis, the controls 144 cause fluid under pressure to be supplied to the upper end of the cylinder 208, as viewed in FIG. 12, and to be exhausted from the lower end thereof to move the brake shoe out of engagement with the track 170. Whenever the operator releases these controls, the drive of the cab by the cylinder 200 stops and fluid under pressure is supplied to the lower end, as viewed in FIG. 12, of the cylinder 208 and exhausted from the upper end thereof so that the brake shoe 220 is forced into braking engagement with the track 170 to lock the cab against movement relative to the chassis.

The control lines and conduits 138 are connected to suitable known control mechanisms including valves and solenoids 230. The control lines and conduits extend with slack therein from the console 136 through tube 232 (FIG. 8) in the cab and are enclosed by protecting covers 234.

The fifth wheel lift mechanism 122 (FIGS. 6, 7, 8 and 16) includes a frame 233 pivoted on pin 235 mounted by clevis portion 236 of the chassis 112. The frame 233 mounts pivotally a fifth wheel 238. Cylinder devices 240 connected at opposite ends to the chassis and the free end of the frame 233 are adapted to raise and lower the free end of the frame 233 and the fifth wheel 238 carried thereby.

The dolly pickup mechanism 124 has arms 250 and 252 and end plate 254 forming a parallelogram linkage with the end of the chassis 112. The links 250 and 252 are pivotally connected to the end of the chassis and the plate 254 by pins 256 and 258, respectively. Plates 260 and 262 fixed to the plate and bracing gussets 264 form an open-mouthed or tapered clevis, and a straight pin 266 operable by a fluid pressure cylinder 268 under the control of the operator in the cab is movable between a raised, retracted position and a lowered, operative position extending through a hole in a hitch of a trailer and a hole 270 in the plate 262 carried by and connected to the chassis. A cylinder 272 fixed to the chassis 112 is adapted to pull in or extend out a piston rod 274 pivotally connected by a loose pin connection 726 to an arm 278 fixed rigidly to the link 250 to raise or lower the clevis. The clevis is adapted to be moved, by moving the prime mover, the clevis being raised or lowered as needed, onto the hitch of the trailer, and then the operator actuates one of the controls 144 to actuate the cylinder 268 to move the pin 266 to its operative or locking position to lock the hitch to the clevis.

Both the fifth wheel mechanism 122 and the dolly pickup mechanism 124 are detachable from the chassis 112, and other units such as, for example, a crane unit, may be attached to the chassis. The dolly pickup mechanism may, if desired, comprise a mounting plate attachable to and detachable from the chassis by bolts, the clevis shown in FIG. 15, a fluid pressure cylinder corresponding to the cylinder 268 mounted on the bottom of the clevis, a cylinder corresponding to the cylinder 272 and parallel arms connected to the mounting plate, the cylinder corresponding to the cylinder 272 being mounted on the bottom of the mounting plate and connected by its piston to the lower arms which correspond to the arms 252.

If desired, the cab may be mounted on the chassis by a pivot or turntable construction comprising a vertical tube or open-ended drum fixed to and extending downwardly from the cab and journaled in a tubular bearing fixed to the chassis, with a brake shoe carried by the chassis movable into and out of engagement with the tube and with the pneumatic, hydraulic and electrical control lines extending from the cab downwardly through the tube to the chassis.

Having illustrated and described preferred embodiments of the present invention, it should be apparent to those skilled in the art that the same permits of many modifications in detail and arrangement. All such modifications as come within the scope of the following claims are considered to be a part of my invention.

What is claimed is:
1. In combination,
   an elongated operator's platform,
   a vehicle chassis of a predetermined width,
   steerable wheel means supporting the chassis,
   a turntable mechanism connecting one end portion of the platform to the chassis and supporting the platform in an overhanging position relative to the chassis for swinging movement of the platform from a first position in which the opposite end portion of the platform extends outwardly beyond one side of the chassis to a second position in which said opposite end portion of the platform extends outwardly beyond the other side of the platform,
   operator-supporting means on said opposite end portion to carry an operator thereon to positions outwardly beyond the sides of the chassis,
   the length of the platform being such relative to the width of the chassis and the platform being so connected to the turntable that said opposite end portion of the platform extends beyond the sides of the chassis when the platform is in said positions,
   first power means on the chassis for driving the steerable wheel means,
   first manually operable means carried by the platform in a position convenient to an operator on the operator-supporting means for controlling the first power means,
   second power means for operating the turntable mechanism,
   and second manually operable means carried by the platform in a position convenient to an operator on the operator-supporting means for controlling the second power means.
2. In a prime mover for yarding trailers,
   a chassis of a predetermined width,
   steerable wheel means supporting the chassis,
   an operator's platform of a predetermined length,
   means connecting the platform pivotally at one end portion thereof to the chassis for movement about a predetermined vertical axis between a first position in which the opposite end portion extends beyond one side of the chassis and a second position in which said opposite end portion of the platform extends beyond the other side of the chassis,
   the length of the platform being sufficient relative to the location of the vertical axis and the width of the chassis to extend beyond the sides of the chassis,
   an operator's seat mounted on said opposite end portion of the platform in a position thereon in which an operator on the seat has clear vision along lines parallel to the length of and at both sides of the chassis,
   first power means for pivoting the platform relative to the chassis,
   second power means carried by the chassis for operating the steerable wheel means,
   and manually operable remote control means carried by the platform in a position convenient to an operator on the seat and operatively connected to the first and second power means.

References Cited by the Examiner

UNITED STATES PATENTS

| | | | |
|---|---|---|---|
| 630,228 | 8/1899 | Horne | 114—8 |
| 677,874 | 7/1901 | Macbeth | 212—69 |
| 2,384,890 | 9/1945 | Coldwell | 180—77 |

(Other references on following page)

UNITED STATES PATENTS

| | | | |
|---|---|---|---|
| 2,422,813 | 6/1947 | Walch | 37—126 |
| 2,513,776 | 7/1950 | Huston | 212—69 |
| 2,549,734 | 4/1951 | White | 280—479 |
| 2,833,367 | 5/1958 | Pool et al. | 180—77 |
| 2,916,300 | 12/1959 | Lindeman et al. | 280—479 |
| 2,928,684 | 3/1960 | Geiger | 280—425 |
| 3,039,553 | 6/1962 | Van Der Lely et al. | 180—77 |
| 3,063,173 | 11/1962 | Wardle | 180—77 |

FOREIGN PATENTS 1,185,913   2/1959   France.

A. HARRY LEVY, *Primary Examiner.*

LEO FRIAGLIA, *Examiner.*

BENJAMIN HERSH, R. C. PODWIL,
*Assistant Examiners.*